US008964571B2

(12) United States Patent
Chaudhry et al.

(10) Patent No.: US 8,964,571 B2
(45) Date of Patent: Feb. 24, 2015

(54) METHOD AND APPARATUS FOR SIMULTANEOUS SUPPORT OF FAST RESTORATION AND NATIVE MULTICAST IN IP NETWORKS

(75) Inventors: Ather J. Chaudhry, Richardson, TX (US); Peter J. Lam, Mountain View, CA (US); Ammar Syed, McKinney, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 283 days.

(21) Appl. No.: 12/144,120

(22) Filed: Jun. 23, 2008

(65) Prior Publication Data

US 2009/0010257 A1 Jan. 8, 2009

Related U.S. Application Data

(60) Provisional application No. 60/948,281, filed on Jul. 6, 2007.

(51) Int. Cl.

| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/761 | (2013.01) |
| H04L 12/751 | (2013.01) |
| H04L 12/707 | (2013.01) |
| H04L 12/703 | (2013.01) |
| H04L 12/723 | (2013.01) |
| H04L 12/721 | (2013.01) |

(52) U.S. Cl.
CPC .............. *H04L 45/16* (2013.01); *H04L 45/02* (2013.01); *H04L 45/22* (2013.01); *H04L 45/28* (2013.01); *H04L 45/50* (2013.01); *H04L 45/66* (2013.01)
USPC ........................... 370/244; 370/223; 370/225

(58) Field of Classification Search
USPC ......... 370/221–223, 225, 235, 237, 242, 244, 370/258
See application file for complete search history.

(56) References Cited

U.S. PATENT DOCUMENTS

| 7,483,440 B2 * | 1/2009 | Choudhury et al. | 370/409 |
| 7,580,417 B2 * | 8/2009 | Ervin et al. | 370/397 |

(Continued)

*Primary Examiner* — Benjamin H Elliott, IV
(74) *Attorney, Agent, or Firm* — Wall & Tong, LLP

(57) ABSTRACT

The invention includes a method and apparatus for simultaneously supporting restoration and native multicast at a router in an Internet Protocol (IP) network. In one embodiment, a method includes establishing a point-to-point pseudowire having an endpoint at the router, associating the point-to-point pseudowire with an IP interface, and associating a multicast protocol with the IP interface. The point-to-point pseudowire is adapted for supporting restoration in response to a failure. The association of the multicast protocol with the IP interface enables running of the multicast protocol in a manner that gives an appearance that the multicast protocol is running natively on an IP link. This methodology may be repeated for each of a plurality of routers in an IP network in order to configure the routers to support restoration capabilities and native multicast capabilities such that fast restoration may be provided in response to failure conditions in a manner that is transparent to a multicast protocol providing multicast capabilities for the IP network. In this manner, both fast restoration and native multicast may be supported within an IP network, e.g., in an IPTV network or other types of IP networks supporting other types of services.

19 Claims, 7 Drawing Sheets

(56) References Cited

U.S. PATENT DOCUMENTS

| | | |
|---|---|---|
| 7,643,409 B2* | 1/2010 | Voit et al. .................... 370/218 |
| 2004/0174887 A1* | 9/2004 | Lee .......................... 370/395.53 |
| 2006/0109802 A1* | 5/2006 | Zelig et al. .................. 370/258 |
| 2007/0008982 A1* | 1/2007 | Voit et al. .................... 370/401 |
| 2007/0217331 A1* | 9/2007 | Khanna et al. ............... 370/224 |
| 2009/0010257 A1* | 1/2009 | Chaudhry et al. ............ 370/390 |
| 2009/0279431 A1* | 11/2009 | Baruah et al. ................ 370/235 |

\* cited by examiner

METHOD AND APPARATUS FOR SIMULTANEOUS SUPPORT OF FAST RESTORATION AND NATIVE MULTICAST IN IP NETWORKS

CROSS-REFERENCE TO RELATED APPLICATIONS

This application claims the benefit of U.S. Provisional Application No. 60/948,281, filed Jul. 6, 2007, which is incorporated by reference herein in its entirety.

FIELD OF THE INVENTION

The invention relates to the field of communication networks and, more specifically, Internet Protocol (IP) multicast networks.

BACKGROUND OF THE INVENTION

In Internet Protocol (IP) Television (IPTV) networks, two primary requirements must be satisfied by the underlying network in order for services to be delivered effectively: fast restoration and efficient multicast. The fast restoration requirement is needed in order for services to converge quickly in response to a failure. In IPTV networks, restoration is typically required to be performed in less than 50 ms. The efficient multicast requirement is needed in order to control consumption of network resources. In IPTV networks, there may be hundreds of high-bandwidth television channels that need to be distributed from a few content sources to potentially millions of content subscribers and, thus, replication of television channels for multicast purposes must be performed as close to the content subscribers as possible in order to minimize consumption of network resources.

In IP networks, Multiprotocol Label Switching (MPLS) is often used to provide fast restoration capabilities and Protocol Independent Multicast (PIM) is used to provide multicast capabilities. In existing IP networks, however, MPLS and PIM cannot be used together because many problems result. First, the PIM Reverse Path Forwarding (RPF) check does not account for MPLS Label Switched Paths (LSPs). Second, even where the PIM RPF checks are successful, this results in multiple Outgoing Interfaces in the Outgoing Interface List (OIL) for multicast replication, and, consequently, multiple point-to-multipoint (P2MP) LSPs are required, thereby complicating provisioning and restoration processes. Third, network convergence after a link failure would take as long as the combined unicast protocol convergence and subsequent multicast protocol convergence (i.e., on the order of seconds).

As described herein, due to the competing considerations of the MPLS and PIM protocols, MPLS and PIM currently cannot be used together in existing IP networks, and, thus, there is no known IP network implementation which can satisfy these requirements for IPTV networks.

SUMMARY OF THE INVENTION

Various deficiencies in the prior art are addressed through a method and apparatus for simultaneously supporting restoration and native multicast at a router in an Internet Protocol (IP) network. In one embodiment, a method includes establishing a point-to-point pseudowire having an endpoint at the router, associating the point-to-point pseudowire with an IP interface, and associating a multicast protocol with the IP interface. The point-to-point pseudowire is adapted for supporting restoration in response to a failure. The association of the multicast protocol to the IP interface enables running of the multicast protocol in a manner that gives an appearance that the multicast protocol is running natively on an IP link. This methodology may be repeated for each of a plurality of routers in an IP network in order to configure the routers to support restoration capabilities and native multicast capabilities such that fast restoration may be provided in response to failure conditions in a manner that is transparent to a multicast protocol providing multicast capabilities for the IP network. In this manner, both fast restoration and native multicast may be supported within an IP network, e.g., in an IPTV network or other types of IP networks supporting other types of services.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables simultaneous support of fast restoration and native multicast in IP networks. Although primarily depicted and described herein within the context of IPTV networks, the present invention may be used simultaneous support of fast restoration and native multicast in various other types of IP networks supporting other types of service.

Figure 1:
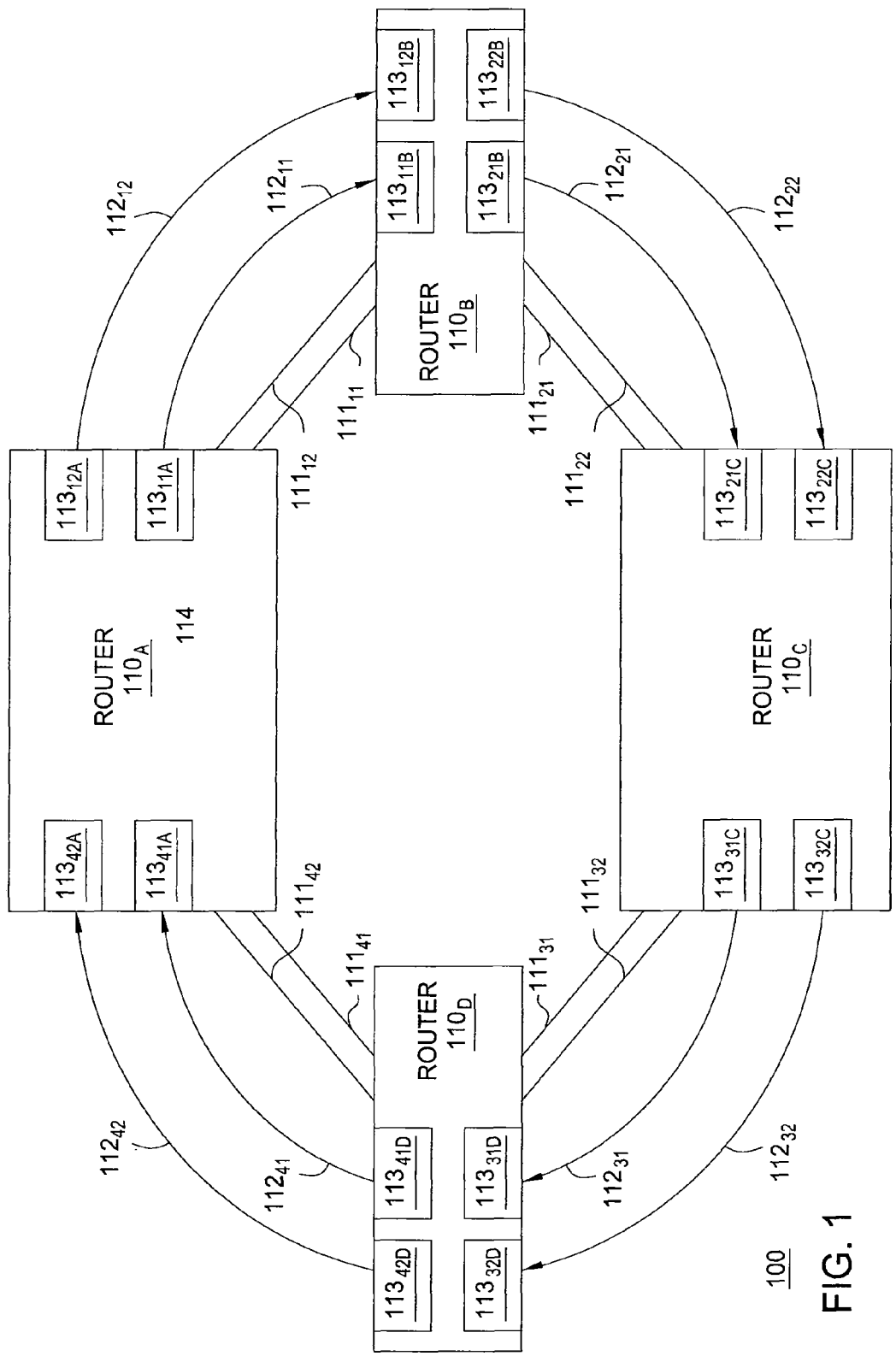
FIG. 1 depicts a high-level block diagram of a communication network.

FIG. 1 depicts a high-level block diagram of a communication network. Specifically, communication network 100 includes a plurality of routers $110_A$-$110_D$ (collectively, routers 110) arranged in a ring topology, where adjacent ones of the routers 110 are connected using respective pairs of physical links. Although depicted as being directly connected, it will be appreciated that the connections between adjacent ones of the routers 110 may traverse various other physical elements which are ignored herein for purposes of clarity in depicting and describing simultaneous use of fast restoration capabilities and multicast capabilities in IP networks.

As depicted in FIG. 1, routers $110_A$ and $110_B$ are connected using a first pair of physical links $111_{11}$ and $111_{12}$ (collectively, physical links $111_1$), routers $110_B$ and $110_C$ are connected using a second pair of physical links $111_{21}$ and $111_{22}$ (collectively, physical links $111_2$), routers $110_C$ and $110_D$ are connected using a third pair of physical links $111_{31}$ and $111_{32}$ (collectively, physical links $111_3$), and routers $110_D$ and $110_A$ are connected using a fourth pair of physical links $111_{41}$ and $111_{42}$ (collectively, physical links $111_4$). The physical links in the pairs of physical links $111_1$-$111_4$ may be collectively referred to as physical links 111. In one embodiment, physical links 111 are Packet over SONET/SDH (POS) links. In one embodiment, physical links 111 are Ethernet links. The physical links 111 may be implemented using other types of physical links.

As depicted in FIG. 1, pairs of point-to-point (P2P) pseudowires (PWs) are established between adjacent ones of the routers 110. A first pair of P2P PWs $112_{11}$ and $112_{12}$ (associated with respective physical links $111_{11}$ and $111_{12}$) is established between routers $110_A$ and $110_B$. A second pair of P2P PWs $112_{21}$ and $112_{22}$ (associated with respective physical links $111_{21}$ and $111_{22}$) is established between routers $110_B$ and $110_C$. A third pair of P2P PWs $112_{31}$ and $112_{32}$ (associated with respective physical links $111_{31}$ and $111_{32}$) is established between routers $110_C$ and $110_D$ A fourth pair of P2P PWs $112_{41}$ and $112_{42}$ (associated with respective physical links $111_{41}$ and $111_{42}$) is established between routers $110_D$ and $110_A$ The P2P PWs in the pairs of P2P PWs $112_1$-$112_4$ may be collectively referred to as P2P PWs 112.

The P2P PWs 112 are unidirectional P2P PWs. In one embodiment, each of the P2P PWs 112 established between adjacent routers 110 may be established in one direction (e.g., each of the P2P PWs 112 is operating in a clockwise direction, as depicted in FIG. 1). Although primarily depicted and described herein with respect to an embodiment in which each of the P2P PWs is established in one direction, in other embodiments P2P PWs may be established using multiple directions (e.g., depending on factors such as the desired configuration of the network, the need for multicast flows in particular directions, interconnections between ring networks to form ring-within-ring networks, and the like, as well as various combinations thereof).

The P2P PWs 112 provide logical paths between routers 110. The P2P PWs 112 may be implemented using any technology capable of supporting fast restoration capabilities. In one embodiment, for example, P2P PWs 112 are implemented as P2P Multi-Protocol Label Switching (MPLS) PWs. In one such embodiment, MPLS Fast Reroute (FRR) capabilities are used to provide link protection (e.g., for physical links 111) and node protection (e.g., for routers 110) via fast detection and recovery capabilities, thereby providing fast restoration from failures. In one embodiment, fast restoration is the capability to recover from a failure in less than 50 ms (although fast restoration may be defined using other time requirements, e.g., depending on the service(s) for which restoration is supported).

In one embodiment, in order to support fast restoration using MPLS FRR capabilities, a primary path and a secondary path (e.g., primary and secondary LSPs) are provisioned for each P2P PW 112. The primary and secondary LSPs may be statically pre-provisioned, dynamically provisioned (e.g., calculated using the Constrained Shortest Path First (CSPF) algorithm or other dynamic algorithms), and the like, as well as various combinations thereof. In one embodiment, the primary and secondary LSPs may be established automatically (e.g., via the Resource Reservation Protocol (RSVP) signaling protocol or any other protocols capable of automatically establishing LSPs).

As described herein, each P2P PW 112 is associated with a pair of logical IP interfaces (i.e., each end of each P2P PW 112 is associated with a logical IP interface). As depicted in FIG. 1, a first endpoint of P2P PW $112_{11}$ between routers $110_A$ and $110_B$ is associated with a logical IP interface $113_{11A}$ on router $110_A$ and a second endpoint of P2P PW $112_{11}$ between routers $110_A$ and $110_B$ is associated with a logical IP interface $113_{11B}$ on router $110_B$. Similarly, a first endpoint of P2P PW $112_{12}$ between routers $110_A$ and $110_B$ is associated with a logical IP interface $113_{12A}$ on router $110_A$ and a second endpoint of P2P PW $112_{12}$ between routers $110_A$ and $110_B$ is associated with a logical IP interface $113_{12B}$ on router $110_B$. A pair of logical IP interfaces 113 is logically associated with each of the other P2P PWs 112. The logical IP interfaces in the pairs of logical IP interfaces $113_1$-$113_4$ may be collectively referred to as logical IP interfaces 113.

In other words, the endpoints of each P2P PWs 112 are IP-based interfaces. In this manner, P2P PWs 112 provide logical paths (e.g., providing MPLS paths, where the P2P PWs 112 are MPLS PWs) over IP paths (i.e., since the P2P PWs 112 are associated with logical IP interfaces 113). In one embodiment, logical IP interfaces 113 are service-enabled IP interfaces. In one such embodiment, for example, logical IP interfaces 113 are Internet Enhancement Service (IES) interfaces. The logical IP interfaces 113 may be implemented using other types of service-enabled IP interfaces.

As described herein, a multicast protocol is running on the logical IP interfaces 113 of routers 110 (rather than running on native IP interfaces of routers 110). The multicast protocol runs on the logical IP interfaces 113 by binding the multicast protocol to the logical IP interfaces 113, which are logically associated with the P2P PWs 112, respectively. In this manner, it appears that the multicast protocol is running natively across native IP links between routers 110. The multicast protocol may be any multicast protocol (e.g., such as Protocol Independent Multicast (PIM) and/or like multicast protocols).

Thus, the configuration depicted and described with respect to FIG. 1 enables simultaneous support of native multicast (using any multicast protocol, such as PIM) and fast restoration (using any protocol capable of delivering fast restoration, such as MPLS).

In one embodiment, Equal-Cost Multi-Path Routing (ECMP) is utilized in order to enable each router 110 to utilize both of the logical IP interfaces 113 in each pair of logical IP interfaces 113.

In one embodiment, ECMP enables each router 110 to utilize both logical IP interfaces 113 in each pair of logical IP interfaces 113 by sharing destination reachability information over two next-hops.

In one embodiment, ECMP enables each router 110 to utilize both logical IP interfaces 113 in each pair of logical IP interfaces 113 for a Multicast PIM Join by sharing source reachability over two reverse path forwarding interfaces (i.e., toward the same source). In one such embodiment, the normal round robin mechanism of the PIM Join is replaced by an implementation in which the PIM Join is distributed round robin based on the number of multicast groups on each of the available logical IP interfaces 113. For example, if a first logical IP interface 113 has three multicast groups and a second logical IP interface 113 has four multicast groups, the first logical IP interface 113 will be chosen first because the first logical IP interface 113 has less multicast groups than the second logical IP interface 113.

In one embodiment, in order for the logical IP interface 113 of a given P2P PWs 112 to be chosen in a unicast routing table of the associated router 110, the logical IP interface 113 must have a lower routing cost than the native IP interface of that associated router 110. This further ensures that the multicast source reachability of the multicast protocol uses the logical IP interface 113 of router 110, rather than using the native IP interface of router 110.

Figure 2:
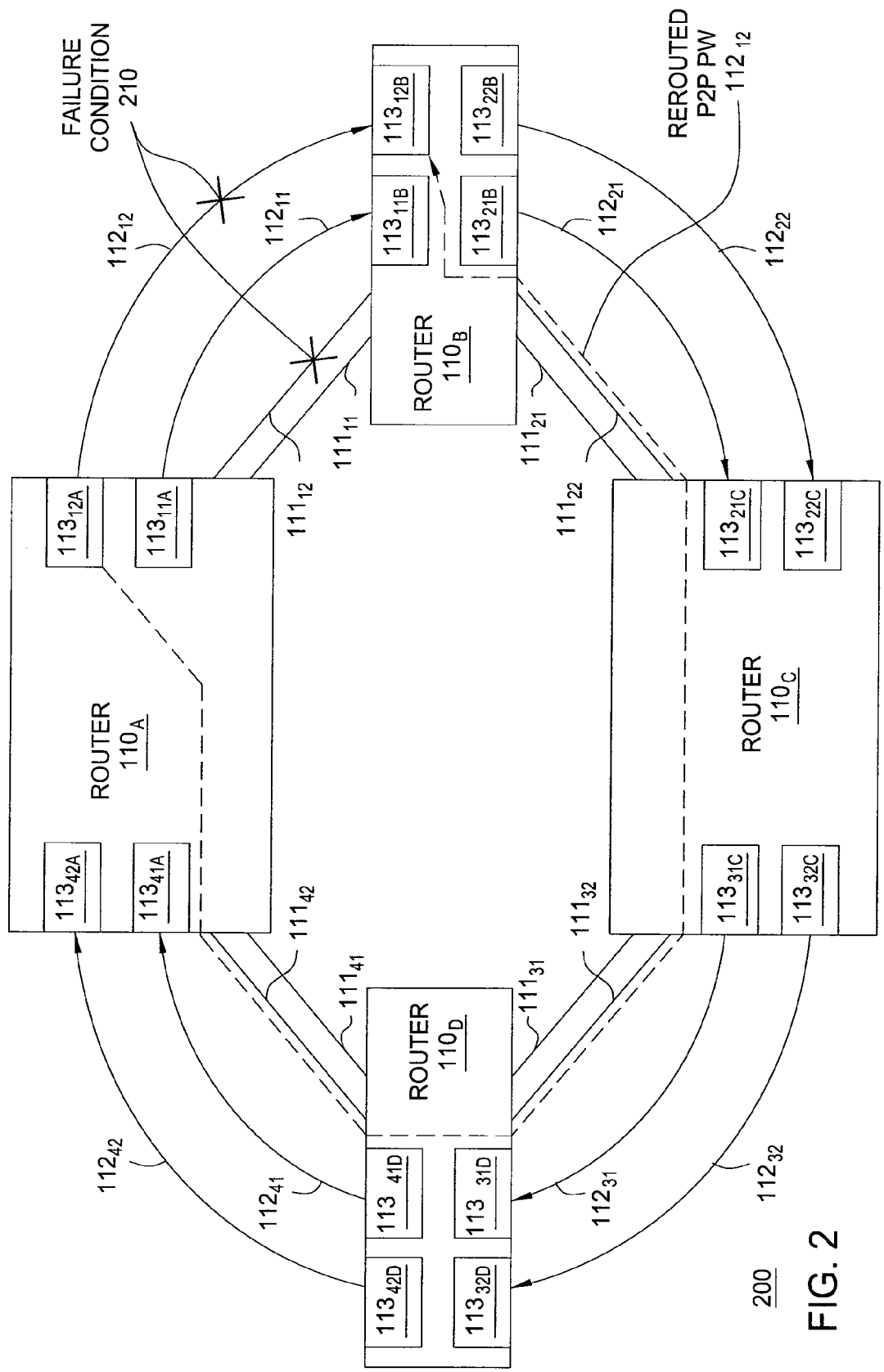
FIG. 2 depicts a high-level block diagram of the communication network of FIG. 1, showing reaction of the communication network to a failure.

FIG. 2 depicts a high-level block diagram of the communication network of FIG. 1, showing reaction of the communication network to a failure.

For the example of FIG. 2, assume that a multicast flow exists from router $110_A$ to router $110_B$. The multicast flow from router $110_A$ to router $110_B$ transports IP packets from router $110_A$ to router $110_B$. The multicast flow is using logical IP interface $113_{12A}$ on router $110_A$ and logical IP interface $113_{12B}$ on router $110_B$, which are each associated with P2P PW $112_{12}$ established for physical link $111_{12}$. In this example, assume that fast restoration between routers 110 is provided using MPLS and multicast distribution of IP packets between routers 110 is provided using PIM.

For the example of FIG. 2, further assume that physical link $111_{12}$ supporting the multicast flow fails (denoted as failure condition 210). As a result of failure condition 210, P2P PW $112_{12}$ established for physical link $111_{12}$ also fails. The router $110_A$ detects failure condition 210 and, using MPLS fast restoration, restores communication between router $110_A$ and router $110_B$ by rerouting the P2P PW $112_{12}$ between router $110_A$ and router $110_B$. As depicted in FIG. 2, the MPLS-based fast restoration restores communication between interface $113_{12A}$ on router $110_A$ and logical IP interface $113_{12B}$ by rerouting the P2P PW $112_{12}$ in the opposite direction between router $110_A$ and router $110_B$. The P2P PW $112_{12}$ is rerouted in the opposite direction using physical links $111_{42}$, $111_{32}$, and $111_{22}$. This is denoted as rerouted P2P PW $112_{12}$ (denoted using a dashed line). Thus, the multicast flow between router $110_A$ and router $110_B$ continues to be supported.

Thus, MPLS-based fast restoration restores logical IP interface $113_{12A}$ on router $110_A$ and restores logical IP interface $113_{12E}$ on router $110_B$. From the perspective of the PIM protocol, the existing multicast flow follows the same logical path after the failure condition 210 as was followed prior to the failure condition 210 (i.e., flowing from source router $110_A$ to destination router $110_B$). Thus, due to the fast restoration provided by MPLS, the failure condition 210 is transparent to the PIM protocol (because the minimum PIM Hello timer is one second and the PIM Hold timer to detect the failure of a link is three seconds, both of which are significantly longer than the time required for MPLS-based fast restoration to reroute the P2P PW $112_{12}$ to restore the logical IP interfaces $113_{12A}$ and $113_{12B}$ after the failure condition).

As an example, consider an IP network that is using MPLS and PIM to transmit packets from a router in New York to a router in Los Angeles via a router in Chicago.

In this example, in an IP network that is attempting to use MPLS and PIM without the present invention, for a packet being transmitted from the router in NY to the router in LA via the router in Chicago using an MPLS LSP established from the router in NY to the router in LA, the router in LA is not aware that the packet is traversing the router in Chicago (i.e., it appears to the router in LA that the packet is received directly from the router in NY). However, the PIM Reverse Path Forwarding (RPF) check performed by the router in LA upon receiving the packet will indicate to the router in LA that it should have received the packet from the router in Chicago rather than from the router in NY (since the PIM RPF check does not account for MPLS LSPs). This result from the PIM RPF check is due to the fact that PIM is operating to ensure that the most efficient multicast replication of packets is being realized. In this case, the router in LA will drop the packet from NY even though there is no problem with the packet. In other words, an IP network that is attempting to use MPLS and PIM without the present invention will not operate properly.

In this example, in an IP network according to the present invention, since MPLS point-to-point pseudowires are established between adjacent ones of the routers (e.g., between the router in NY and the router in Chicago, between the router in Chicago and the router in LA, and between the router in LA and the router in NY) the router in LA is aware that the packet is traversing the router in Chicago. Thus, the PIM RPF check performed by the router in Los Angeles upon receiving the packet will be successful (i.e., the PIM RPF check will indicate to the router in LA that it should have received the packet from the router in Chicago, and the router in LA is in fact aware that the packet is being received from the router in NY indirectly via the router in Chicago). In other words, the present invention enables simultaneous use of MPLS and PIM within an IP network. Thus, the present invention enables simultaneous support of fast restoration (e.g., using MPLS, as in this example, or any other protocol supporting fast restoration capabilities, as described herein) and multicast (e.g., using PIM, as in this example, or any other protocol supporting multicast capabilities, as described herein).

Figure 3:
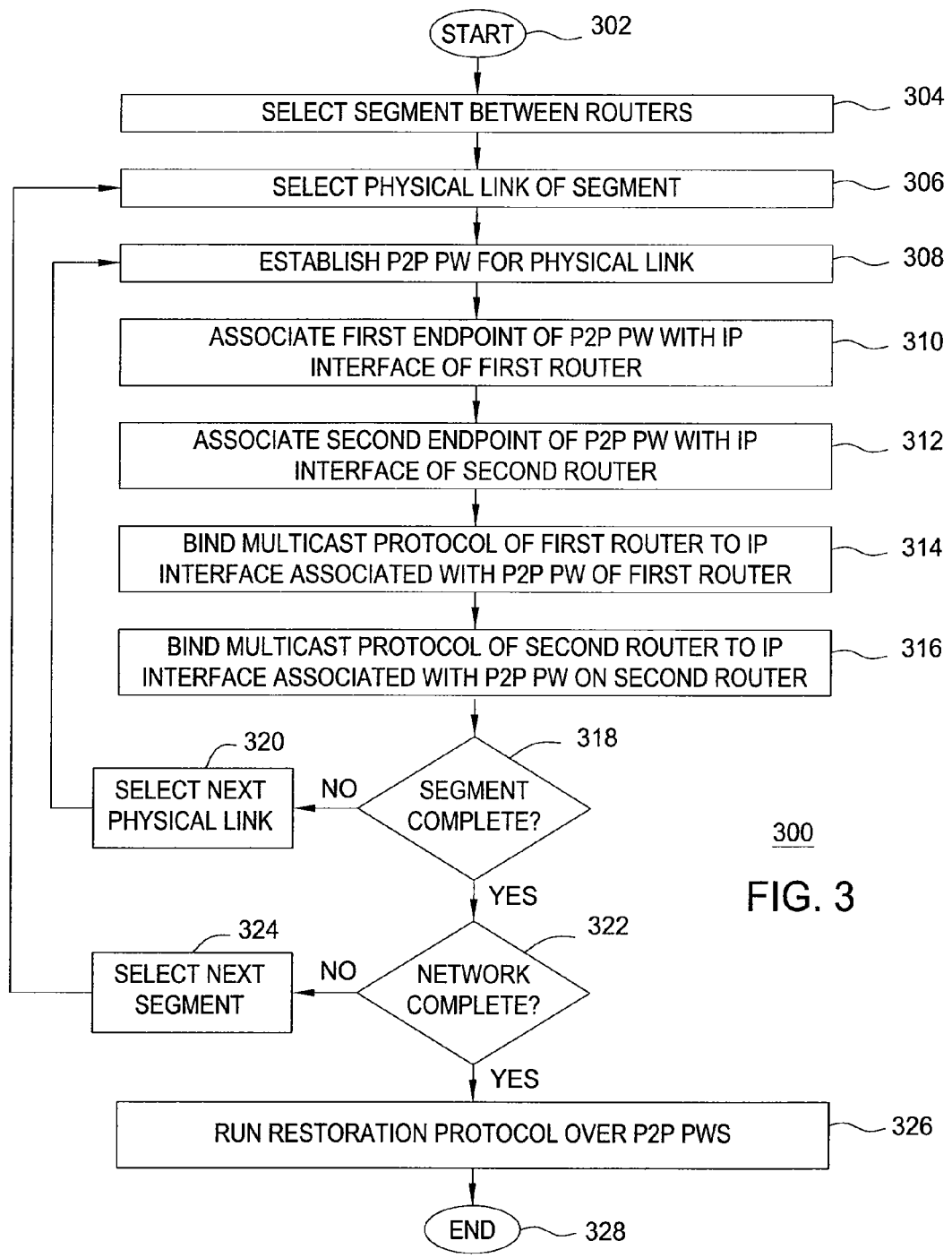
FIG. 3 depicts a method according to one embodiment of the invention.

FIG. 3 depicts a method according to one embodiment of the present invention. Specifically, method 300 of FIG. 3 includes a method for forming an IP network supporting fast restoration using a restoration protocol and native multicast capabilities using a multicast protocol. Although primarily depicted and described herein as being performed serially, at least a portion of the steps of method 300 may be performed contemporaneously, or in a different order than depicted and described with respect to FIG. 3. The method 300 begins at step 302 and proceeds to step 304.

At step 304, a segment between routers (denoted as a first router and a second router) is selected. At step 306, a physical link of the segment is selected. At step 308, a P2P PW is established for the physical link of the segment.

At step 310, a first endpoint of the established P2P PW is associated with an IP interface of the first router. At step 312, a second endpoint of the established P2P PW is associated with an IP interface of the second router.

At step 314, the multicast protocol is associated with the IP interface associated with the P2P PW on the first router (i.e., bound to the IP interface associated with the P2P PW). At step 316, the multicast protocol is associated with the IP interface associated with the P2P PW on the first router (i.e., bound to the IP interface associated with the P2P PW).

At step 318, a determination is made as to whether or not the selected segment is complete (e.g., whether or not additional P2P PWs will be established between that pair of routers). If the selected segment is not complete, method 300 proceeds to step 318, at which point the next physical link of the segment is selected, and, from step 318, returns to 308 such that a P2P PW may be provisioned for another physical link connecting the first router and the second router over the selected segment). If the selected segment is complete, method 300 proceeds to step 322.

At step 322, a determination is made as to whether or not the network is complete (e.g., whether or not all segments between routers have been configured to support restoration and multicast capabilities). If the network is not complete, method 300 proceeds to step 324, at which point the next segment is selected, and, from step 324, returns to 306 such that a P2P PW(s) may be provisioned for a physical link(s) connecting the routers of the newly selected segment. If the network is complete, method 300 proceeds to step 326.

At step 326, a restoration protocol is run over the P2P PWs. At this point, the multicast protocol is running using the association of the multicast protocol to the IP interfaces. Thus, the configured network is simultaneously supporting both restoration capabilities and multicast capabilities. At step 328, method 300 ends. Although depicted and described as ending (for purposes of clarity), the configured network continues to operate, thereby providing simultaneous support for both restoration capabilities and multicast capabilities.

Figure 4:
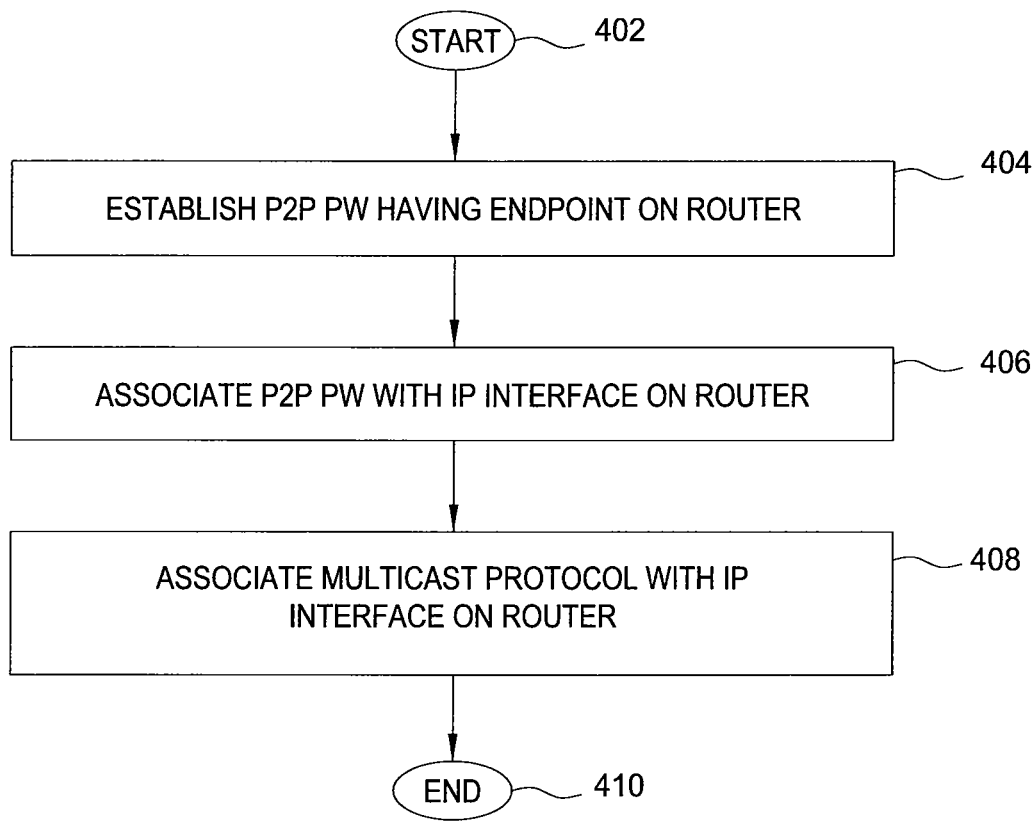
FIG. 4 depicts a method according to one embodiment of the invention.

FIG. 4 depicts a method according to one embodiment of the present invention. Specifically, method 400 of FIG. 4 includes a method for configuring a router in an IP network to support both fast restoration capabilities and native multicast capabilities. Although depicted and described herein as being performed serially, at least a portion of the steps of method 400 may be performed contemporaneously, or in a different order than depicted and described with respect to FIG. 4. The method 400 begins at step 402 and proceeds to step 404.

At step 404, a P2P PW is established. The P2P PW has two endpoints (one on the router being configured and one on another router adjacent to the router being configured). At step 406, the P2P PW (i.e., the endpoint of the P2P PW on the router being configured) is associated with an IP interface of the router being configured. At step 408, a multicast protocol is associated with the IP interface on the router being configured (i.e., the multicast protocol is bound to the IP interface). At step 410, method 400 ends.

In this manner, the router is configured to run both the restoration protocol and the multicast protocol simultaneously over the P2P PW while avoiding any of the problems previously resulting from running a restoration protocol and a multicast protocol together over an IP network. Although depicted and described as ending, each of the routers in the network may be configured in this manner such that the network may simultaneously support both the restoration protocol and the multicast protocol.

Figure 5:
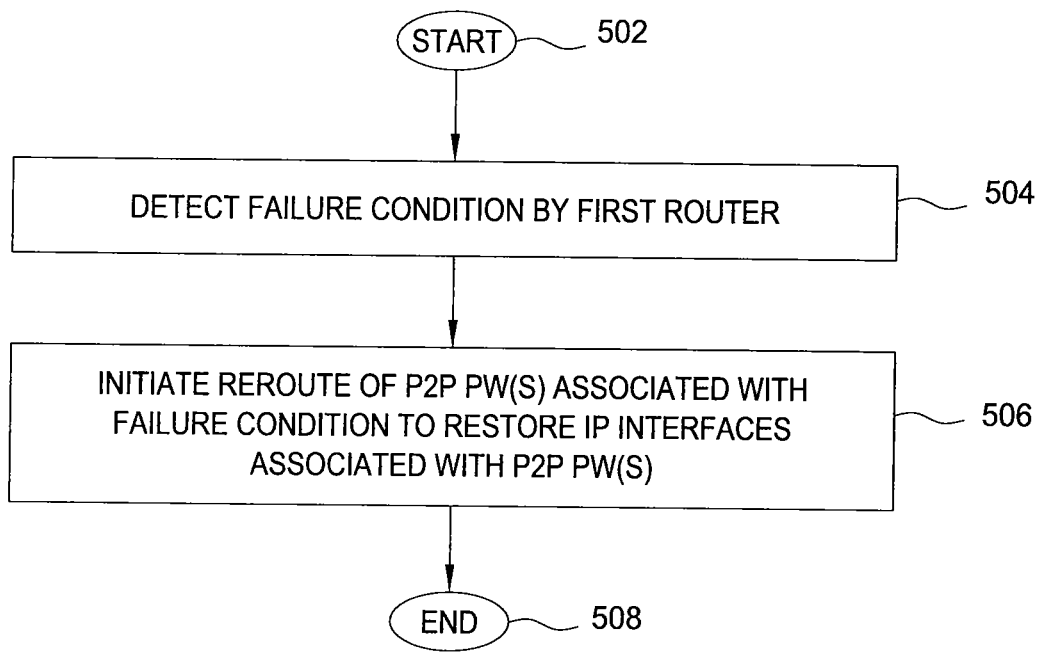
FIG. 5 depicts a method according to one embodiment of the invention

FIG. 5 depicts a method according to one embodiment of the present invention. Specifically, method 500 of FIG. 5 includes a method for reacting to a failure in an IP network supporting both fast restoration and native multicast capabilities. Although depicted and described herein as being performed serially, at least a portion of the steps of method 500 may be performed contemporaneously, or in a different order than depicted and described with respect to FIG. 5. The method 500 begins at step 502 and proceeds to step 504.

At step 504, a failure condition is detected. The failure condition is detected at a first router. The failure condition may be any type of failure condition which may be detected at the first router (e.g., a hardware failure, a link failure, or some other failure condition has occurred and been detected at the first router).

A P2P PW exists between the routers. An IP interface on the first router is associated with the endpoint of the P2P PW that terminates on the first router and an IP interface on the second router is associated with the endpoint of the P2P PW that terminates on the second router. A restoration protocol is running over the P2P PW. A multicast protocol is associated with the IP interface on the first router and is associated with the IP interface on the second router.

At step 506, in response to detection of the failure condition, restoration is performed using the restoration protocol running on the P2P PWs. The first router determines the P2P PW(s) impacted by the failure condition. The first router initiates rerouting of the P2P PW(s) associated with the failure condition using the restoration protocol. For purposes of clarity, restoration is described herein for one P2P PW, although this process may be repeated for each P2P PW impacted by a detected failure condition.

The P2P PW is rerouted using a secondary path between the first and second routers. The rerouting of the P2P PW restores communication between the IP interface on the first router and the IP interface on the second router, thereby enabling restoration of the IP interfaces on the respective first and second routers before the failure condition is detected by the multicast protocol.

Thus, as a result of the fast restoration of the IP interfaces using the rerouting of the P2P PW, any multicast flows between the first router and the second router continue to be supported without being impacted by the failure condition. The IP interfaces on the respective first and second routers are restored such that the failure condition is transparent to the multicast protocol, and, thus, is transparent to multicast flows transporting data between the first router and the second.

At step 508, method 500 ends. Although depicted and described as ending (for purposes of clarity), upon completion of the reroute of the P2P PW, the IP interfaces on the first and second routers are restored and the multicast protocol continues to operate without experiencing the failure condition. Although depicted and described herein as ending (for purposes of clarity), following clearing of the failure condition (e.g., the second router is repaired, the physical link is repaired, and the like), the network may or may not revert to the original configuration.

Although primarily depicted and described herein with respect to embodiments in which a single ring topology network is used to provide restoration and multicast capabilities, it will be appreciated that in order to provide improved network connectivity for delivery of information from content sources to subscribers, many such ring networks may be interconnected to form ring-within-ring networks, thereby improving network connectivity for delivery of information from content sources to subscribers. An exemplary ring-within-ring network is depicted and described herein in FIG. 6.

Figure 6:
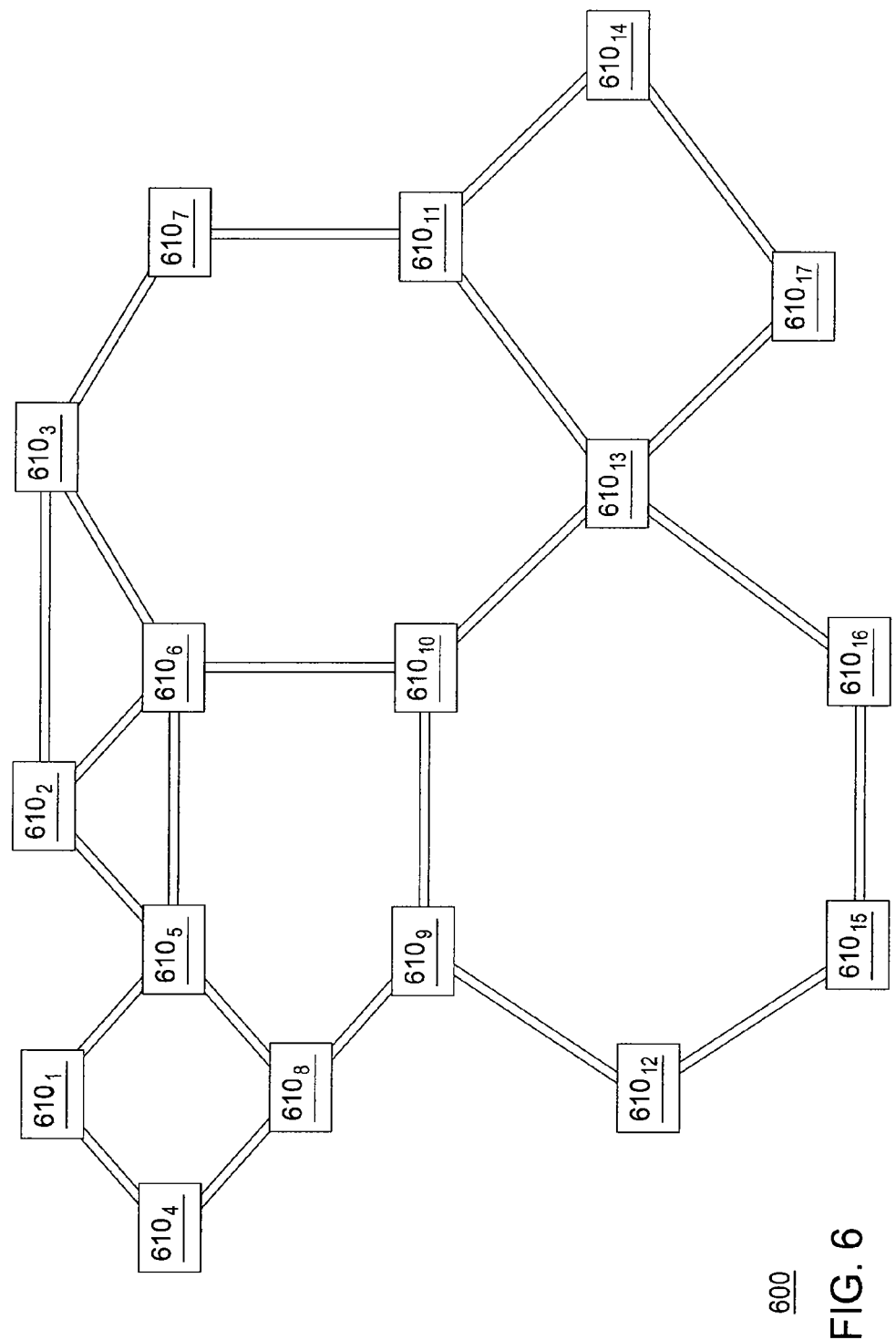
FIG. 6 depicts a high-level block diagram an exemplary ring-within-ring communication network.

FIG. 6 depicts a high-level block diagram an exemplary ring-within-ring communication network. As depicted in FIG. 6, a plurality of routers $610_1$-$610_{17}$ (collectively, routers 610) are connected and configured to form numerous ring networks, including ring networks within ring networks.

For example, as depicted in FIG. 6, routers $610_1$, $610_5$, $610_8$, and $610_4$ form a first ring and routers $610_5$, $610_6$, $610_{10}$, $610_9$, and $610_8$ form a second ring, and the first and second rings are interconnected via routers $610_5$ and $610_8$ such that routers of the first ring may communicate with routers of the second ring using a combination of the two rings (e.g., router $610_1$ may communicate with router $610_{10}$ via a first path from router $610_1$ to router $610_5$ to router $610_6$ to router $610_{10}$ or via a second path from router $610_1$ to router $610_4$ to router $610_8$ to router $610_9$ to router $610_{10}$.

Similarly, for example, as depicted in FIG. 6, routers $610_1$, $610_5$, $610_2$, $610_6$, $610_{10}$, $610_9$, $610_8$, and $610_4$ form a first ring and routers $610_3$, $610_7$, $610_{11}$, $610_{13}$, $610_{10}$, and $610_6$ form a second ring, and the first and second rings are interconnected via routers $610_6$ and $610_{10}$ such that routers of the first and second rings may communicate using a combination of the two rings (e.g., router $610_1$ may communicate with router $610_{13}$ via a first path that traverses routers $610_1$, $610_5$, $610_2$, $610_6$, $610_3$, $610_7$, $610_{11}$, and $610_{13}$ or via a second path that traverses routers $610_1$, $610_4$, $610_8$, $610_9$, $610_{10}$, and $610_{13}$).

In this manner, routers 610 may be connected and configured to form numerous ring networks, including ring networks within ring networks, such that communications between any pair of routers may be supported using the present invention.

Although primarily depicted and described herein with respect to embodiments associated with IPTV networks, the present invention may be used to simultaneously support fast restoration capabilities and native multicast capabilities in IP networks providing various other types of services.

Although primarily depicted and described herein with respect to one P2P PW being associated with each physical link, in other embodiments one or more of the physical links may have more than one P2P PW associated therewith.

Although primarily depicted and described herein with respect to one P2P PW being impacted by a failure condition, it will be appreciated that multiple P2P PWs may be impacted by a failure condition (e.g., depending on the number of P2P PWs established for each physical link, the type of failure condition (e.g., a failure of a node may impact multiple P2P PWs), and the like, as well as various combinations thereof. Thus, multiple restoration processes may be performed in response to a detected failure condition where multiple P2P PWs are impacted by the failure condition.

Although primarily depicted and described herein with respect to using MPLS for fast restoration, various other protocols may be utilized to provide fast restoration with native multicast in accordance with the present invention.

Although primarily depicted and described herein with respect to using PIM for multicast, various other protocols may be utilized to provide multicast with fast restoration in accordance with the present invention.

Figure 7:
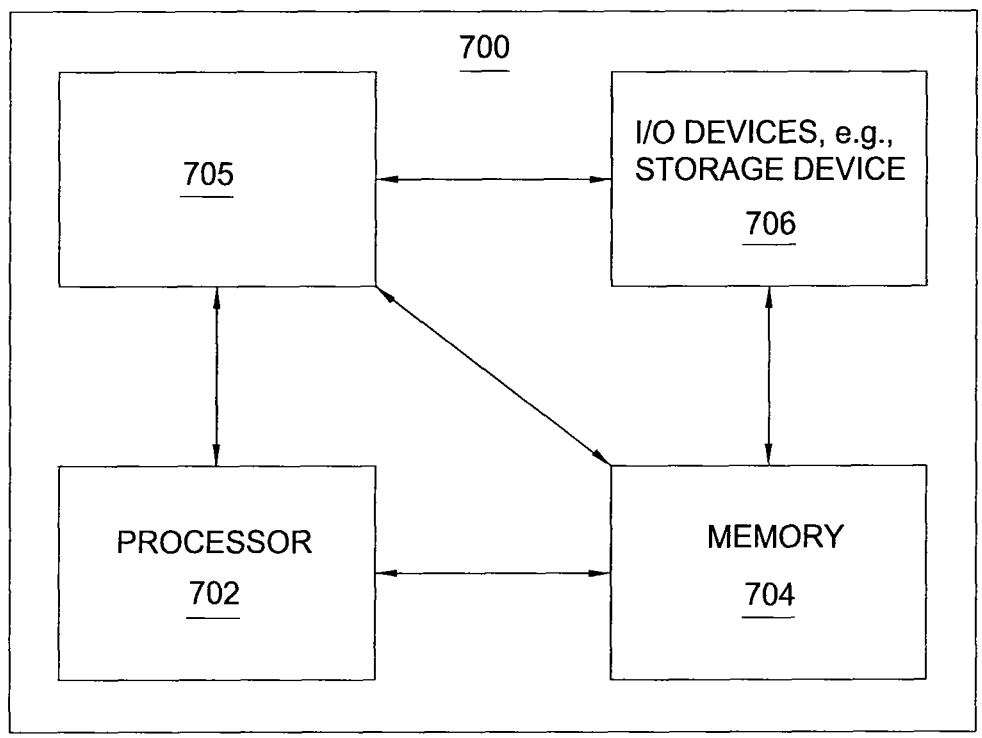
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a restoration/multicast control module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the restoration/multicast control process 705 can be loaded into memory 704 and executed by processor 702 to implement the functions as discussed above. As such, restoration/multicast control process 705 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for supporting restoration and multicast at a router in an Internet Protocol (IP) network, comprising:
a processor and a memory communicatively connected to the processor, the processor configured to:
receive, at the router, a multicast packet of a multicast source, wherein the multicast packet is received via a communication path between the multicast source and the router, wherein the communication path is associated with a point-to-point (P2P) pseudowire (PW) between the router and an upstream router, wherein the P2P PW has a restoration protocol associated therewith, wherein the multicast packet is received via a logical IP interface of the router, wherein an endpoint of the P2P PW on the router and the multicast protocol running on the router are associated with the logical IP interface of the router; and
determine, based on a reverse path forwarding check performed by the router based on the multicast protocol, that the multicast packet is received from the upstream router.

2. The apparatus of claim 1, wherein the P2P PW comprises a Multiprotocol Label Switching (MPLS) P2P PW.

3. The apparatus of claim 1, wherein the restoration protocol comprises a Multiprotocol Label Switching (MPLS) Fast Reroute (FRR) protocol.

4. The apparatus of claim 1, wherein the restoration protocol supports fast restoration occurring in less than 50 ms.

5. The apparatus of claim 1, wherein the logical IP interface of the router comprises a service-enabled IP interface.

6. The apparatus of claim 1, wherein the communication path between the multicast source and the router comprises a label switched path (LSP).

7. The apparatus of claim 1, wherein the multicast protocol comprises Protocol Independent Multicast (PIM).

8. The apparatus of claim 1, wherein the processor is configured to:
receive, at the router via a secondary communication path associated with the P2P PW between the router and the upstream router, a message configured to restore the logical IP interface of the router in response to a failure condition impacting communication from the upstream router to the router, thereby rendering the failure condition transparent to the multicast protocol.

9. The apparatus of claim 1, wherein the router comprises a native IP interface, wherein the router comprises a unicast routing table, wherein the processor is configured to:
propagate multicast source reachability information from the router toward the upstream router via the logical IP interface based on determination that an entry of the unicast routing table associated with the logical IP interface has a lower cost than an entry of the unicast routing table associated with the native IP interface.

10. A method for supporting restoration and multicast at a router in an Internet Protocol (IP) network, comprising:
receiving, at the router, a multicast packet of a multicast source, wherein the multicast packet is received via a communication path between the multicast source and the router, wherein the communication path is associated with a point-to-point (P2P) pseudowire (PW) between the router and an upstream router, wherein the P2P PW has a restoration protocol associated therewith, wherein the multicast packet is received via a logical IP interface of the router, wherein an endpoint of the P2P PW on the router and the multicast protocol running on the router are associated with the logical IP interface of the router; and determining, based on a reverse path forwarding check performed by the router based on the multicast protocol, that the multicast packet is received from the upstream router.

11. An apparatus, comprising:
a processor and a memory communicatively connected to the processor, the processor configured to:
propagate a multicast packet of a multicast flow from a first router toward a second router using a multicast protocol running on the first router, wherein the multicast packet is propagated via a primary communication path associated with a point-to-point (P2P) pseudowire (PW) between the first router and the second router, wherein the P2P PW has an endpoint on the first router, wherein the P2P PW has a restoration protocol associated therewith, wherein the multicast packet is propagated via a first logical Internet Protocol (IP) interface of the first router toward a second logical IP interface of the second router, wherein the endpoint of the P2P PW on the first router and the multicast protocol running on the first router are associated with the first logical IP interface of the first router;
detect, at the first router, a failure condition impacting communication of the multicast flow from the first router toward the second router via the primary communication path associated with the P2P PW; and
initiate a restoration of communication between the first logical IP interface of the first router and the second logical IP interface of the second router, via a secondary communication path associated with the P2P PW, using the restoration protocol associated with the P2P PW.

12. The apparatus of claim 11, further comprising:
propagating a second multicast packet of the multicast flow from the first router toward the second router, using the multicast protocol, via the secondary communication path between the first router and the second router.

13. The apparatus of claim 11, wherein the P2P PW comprises a Multiprotocol Label Switching (MPLS) P2P PW.

14. The apparatus of claim 11, wherein the restoration protocol comprises a Multiprotocol Label Switching (MPLS) Fast Reroute (FRR) protocol.

15. The apparatus of claim 11, wherein the restoration protocol supports fast restoration occurring in less than 50 ms.

16. The apparatus of claim 11, wherein the logical IP interface of the first router comprises a service-enabled IP interface.

17. The apparatus of claim 11, wherein the primary communication path comprises a label switched path (LSP).

18. The apparatus of claim 11, wherein the multicast protocol comprises Protocol Independent Multicast (PIM).

19. A method, comprising:
propagating a multicast packet of a multicast flow from a first router toward a second router using a multicast protocol running on the first router, wherein the multicast packet is propagated via a primary communication path associated with a point-to-point (P2P) pseudowire (PW) between the first router and the second router, wherein the P2P PW has an endpoint on the first router, wherein the P2P PW has a restoration protocol associated therewith, wherein the multicast packet is propagated via a first logical Internet Protocol (IP) interface of the first router toward a second logical IP interface of the second router, wherein the endpoint of the P2P PW on the first router and the multicast protocol running on the first router are associated with the first logical IP interface of the first router;
detecting, at the first router, a failure condition impacting communication of the multicast flow from the first router toward the second router via the primary communication path associated with the P2P PW; and
initiating a restoration of communication between the first logical IP interface of the first router and the second logical IP interface of the second router, via a secondary communication path associated with the P2P PW, using the restoration protocol associated with the P2P PW.

* * * * *